Sept. 19, 1950      M. RUHEMANN     2,522,640
SEPARATION OF HYDROCARBON
GASES AT LOW-TEMPERATURES Filed Feb. 18, 1948                                2 Sheets—Sheet 1

Inventor
M. Ruhemann
By Flesuck Downing
Attys

Sept. 19, 1950

M. RUHEMANN 2,522,640

SEPARATION OF HYDROCARBON
GASES AT LOW-TEMPERATURES

Filed Feb. 18, 1948

Inventor
M. Ruhemann
By Mason & Downing Ruble
Attys

Patented Sept. 19, 1950

2,522,640

UNITED STATES PATENT OFFICE 2,522,640

SEPARATION OF HYDROCARBON GASES AT LOW TEMPERATURES

Martin Ruhemann, London, England, assignor to Petrocarbon Limited, London, England Application February 18, 1948, Serial No. 9,175
In Great Britain February 19, 1947

5 Claims. (Cl. 62—175)

This invention relates to the separation of low temperatures of hydrocarbon gases from a mixture of gases consisting substantially of alkanes or alkenes or a mixtures of alkanes and alkenes, with or without hydrogen, for instance, a mixture of oil gases consisting substantially of alkanes and alkenes and hydrogen obtained by the thermal cracking of petroleum oil.

When such gaseous mixtures are separated by condensation and fractionation at low temperatures, it is important to prevent formation of ice in the interior of the plant since the ice will otherwise block the pipes and also reduce the rate of transfer of heat across walls on the surface of which it is deposited. It is, however, customary to dry the gaseous mixtures as thoroughly as possible before they are cooled to the low temperatures required and there are many known methods for performing this operation. These involve the use of expensive drying plant and furthermore, however thoroughly the gases are dried by any of these known methods, it has been found that a certain amount of water vapour penetrates into the interior of the separating plant. This water vapour is precipitated as ice and accumulates in the pipes and vessels of the apparatus, leading eventually to the necessity of the plant being closed down and thawed out.

The object of the invention is to provide a process for preventing the formation of ice in the interior of pipes and vessels in the low temperature separation process referred to above, and in which the use of expensive drying equipment is avoided or unnecessary.

It is known that a number of organic compounds, for example methyl alcohol, ethyl alcohol, and propyl alcohol, form solutions with water which remain liquid down to low temperatures and their use for anti-freeze purposes has been proposed but these compounds are generally themselves miscible within wide limits in hydrocarbons in liquid form and their mixtures and there is a tendency for ice to precipitate from aqueous solutions containing these compounds when in association with the hydrocarbon liquids, at temperatures higher than would be the case in the absence of the hydrocarbons.

It has now been found that in contradistinction to ethyl alcohol and propyl alcohol, methanol or methanol/water mixtures are not miscible with condensates of alkanes and alkenes containing not more than 5 carbon atoms in the molecule and methanol can be used successfully to prevent ice formation in the presence of such hydrocarbons down to a temperature well below the freezing point of methanol that is down to a temperature of −138° C., at about which temperature methanol forms a eutectic mixture with ice.

The present invention consists in a process for the separation at low temperatures of hydrocarbon gases from a mixture of gases consisting substantially of alkanes or alkenes or a mixture of alkanes and alkenes, with or without hydrogen, for instance, a mixture of oil gases consisting substantially of alkanes and alkenes and hydrogen obtained by the thermal cracking of petroleum oil, which process comprises a hydrocarbon liquefaction step taking place down to a temperature not below −138° C. and in which processs there is added for the prevention of the formation of ice in the pipes and vessels traversed by the aforesaid gases and their condensates such a quantity of methanol, which may be determined as hereinafter described, as will reduce the temperature at which ice formation will take place to a temperature below that at which the liquefaction step ends.

The invention also consists in a process according to the preceding paragraph in which the said liquefaction step takes place down to a temperature between −100° C. and −138° C.

The invention also consists in a process according to either of the preceding two paragraphs in which the predetermined quantity of methanol is introduced into the gas stream as a vapour before it enters into the cold portion of the apparatus.

The invention also consists in a process in accordance with any of the preceding three paragraphs in which the methanol/water condensate formed during the said liquefaction step is removed at the end of the said liquefaction step, or alternatively in which the methanol/water condensate formed during the said liquefaction step is removed at a later stage of the process at a higher temperature than that at which the said liquefaction step ends.

The invention also consists in a process for the separation of hydrocarbon gases substantially as described below.

Referring to the accompanying diagrammatic drawings.

Figure 1:
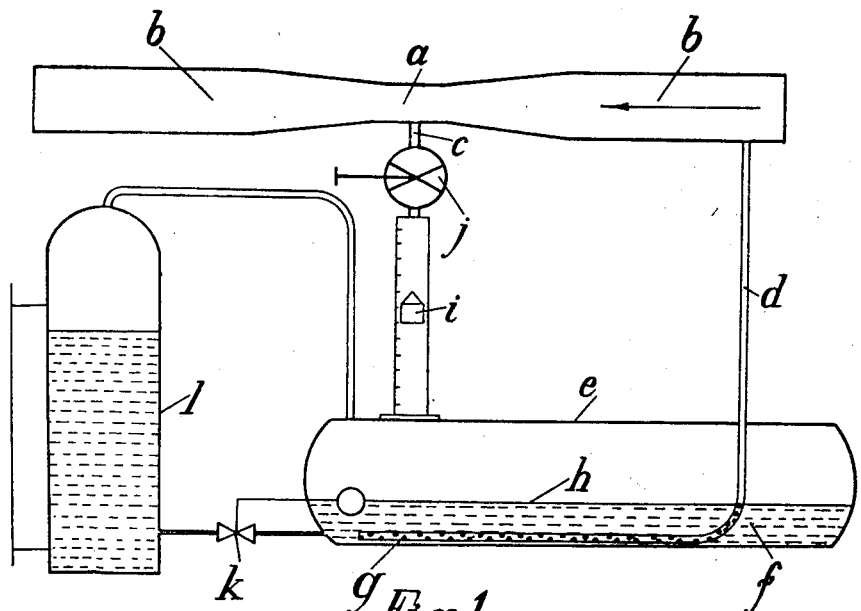
Figure 1 illustrates an apparatus for the introduction of a predetermined quantity of methanol into the system.

In carrying the invention into effect in the form illustrated, more particularly with reference to Figure 1, a predetermined quantity of methanol is introduced as a solvent vapour into the stream of gases, which are to be subjected to a low temperature separation process, before it enters the cold portion of the apparatus by means of a constriction $a$ introduced into a pipe $b$ traversed by the gas in the direction of the arrow. Two branch pipes $c$ and $d$ are attached to this pipeline, one $c$ in the region of the constriction $a$, the other $d$ at a point traversed by the gas before it reaches the constriction. These two branch pipes lead to a flat horizontal vessel $e$ containing the methanol $f$. The pipe $d$ passes below the level of the methanol in the vessel $e$ in a horizontal direction, and carries a series of holes $g$ which are thus situated below the surface $h$ of the liquid. The other branch pipeline $c$, which is connected to the main pipe $b$ at the constriction $a$, contains a rotameter or some similar device $i$ for measuring the rate of gas flow through the vessel $e$. Owing to the constriction $a$ in the main pipeline $b$, a small portion of the gas is forced through the vessel $e$ containing the methanol $f$, and carries with it a portion of methanol vapour which depends on the amount of gas flowing through the vessel $e$ and on the vapour pressure of the methanol. The rate of flow of gas through the vessel $e$ can be regulated by a valve $j$ in the branch pipeline. The level of the liquid in the vessel $e$ is maintained constant by a float-operated valve $k$ which allows so much methanol to flow into the vessel $e$ from a reservoir $l$ as is carried away as vapour by the gas.

Figure 2:
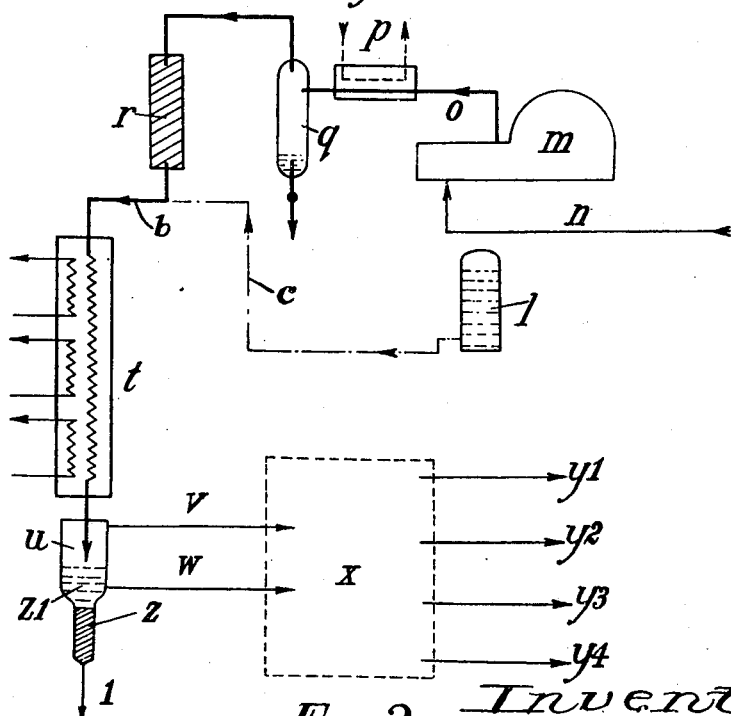
Figure 2 illustrates a plant embodying means according to the present invention for preventing ice formation in hydrocarbons at low temperatures.

Referring now more particularly to Figure 2, a compressor $m$ is provided to which the hydrocarbon mixture is admitted by a pipeline $n$, and which it leaves at an elevated pressure through a pipeline $o$. The heat of compression is then removed in a cooler $p$ with water, in the course of which cooling a portion of the water vapour present in the hydrocarbon mixture condenses. The water so formed is drained off in a separator $q$, and the compressed gas flows through a dryer $r$, which may be filled with any suitable dessicant, and thence through a pipeline $b$ to a system of heat exchangers $t$. A predetermined quantity of methanol is injected into the gas stream passing through the pipeline $b$ by means of the apparatus illustrated in Figure 1, the vessel $l$ and pipe $c$ only, being shown in Figure 2. The gas mixture is cooled to a low temperature and partially condensed in thermal contact with a number of refrigerants in the system of heat exchangers $t$, in which the mixture is cooled to a low temperature and partially condensed in thermal contact with a number of refrigerants. The cooled and partially liquefied mixture, containing the solution of water in methanol, passes from the series of heat exchangers into a separating vessel $u$ in which it separates into a gaseous mixture of hydrocarbons, a liquid mixture of hydrocarbons and a liquid layer of methanol containing dissolved water. From the separating vessel the gaseous and liquid hydrocarbons are conducted by pipes $v$ and $w$ respectively to a gas separating plant $x$, which may contain any number of fractionating towers or other equipment. The products of separation leave the gas separating plant through various pipelines $y^1$, $y^2$, $y^3$ and $y^4$.

The methanol containing water, which forms a liquid layer $z$ may be separated from the liquefied hydrocarbons $z^1$ in the separating vessel $u$ referred to above and in this case it is drained from the vessel through a valve $l$, and after drying may be re-introduced into the storage vessel $l$ for further use.

Alternatively, the methanol containing water may be introduced together with the liquefied hydrocarbons into the middle of the first fractionating tower which has a temperature above that at which the liquefaction step ends at the bottom and a lower temperature at the top. Thus, for example, in a process for the separation of oil gases in which the liquefaction is carried down to —114° C., the liquefied hydrocarbon and methanol/water mixtures are introduced at this temperature into the middle of a fractionating column which has a temperature of about —60° C. at the bottom and —145° C. at the top. No methanol or water will penetrate anywhere near the top of the column and should not be traceable above the feed. All the methanol and water will collect at the bottom of the column where the temperature is so high that there is no question of the formation of solids.

In its further passage through the plant, the methanol/water mixture becomes progressively warmer and it may easily be separated from the rest of the liquid at any convenient point in view of its immiscibility with hydrocarbons.

Figure 3:
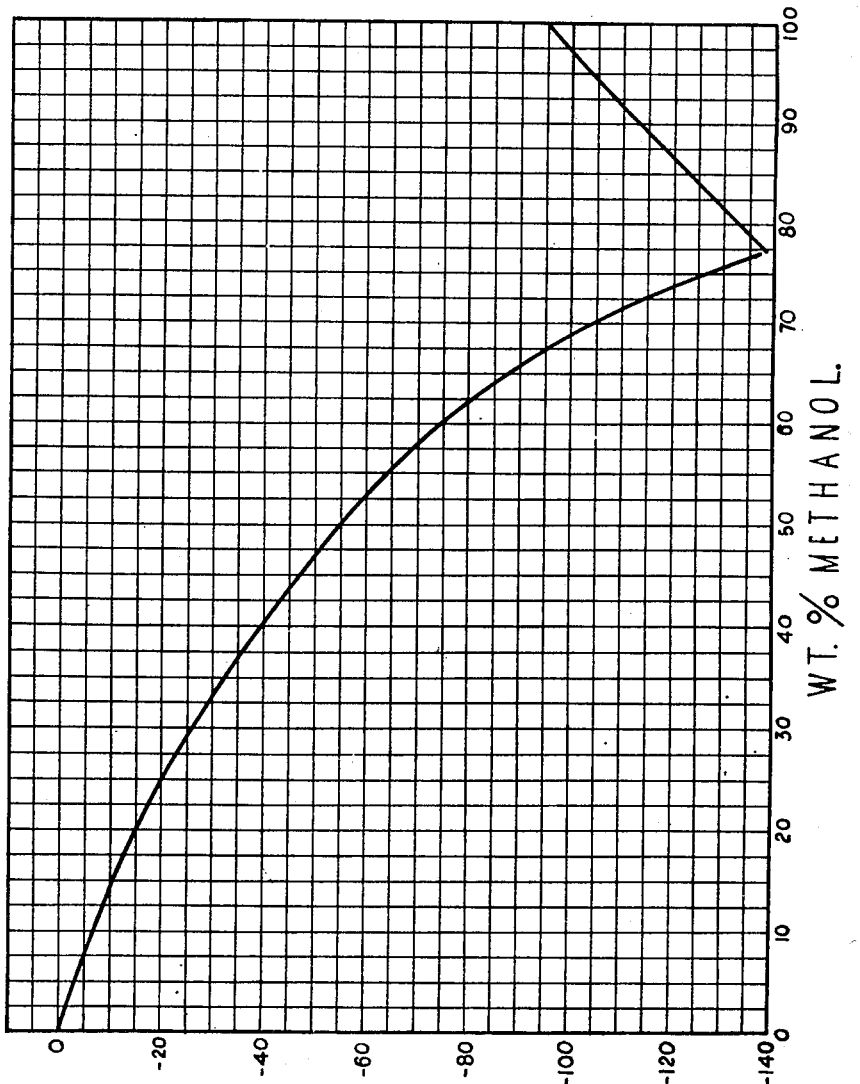
Figure 3 is a curve showing the relationship between the weight of methanol in methanol/water mixtures as a percentage, and the corresponding freezing point in degrees centigrade, the methanol/ice eutectic being with 77 per cent. of methanol at about —138.5° C.

The appropriate quantity of methanol to be added in accordance with the invention may be deduced from the curve, Figure 3. Thus, if the liquefaction is carried down to —110° C., the quantity of methanol added may vary so that it constitutes between 72% and 91% by weight of the total weight of methanol and water in the mixture. If the liquefaction is carried down to —115° C. the methanol should constitute between 73% and 88% of the total weight of methanol and water.

The amount of water in the gaseous mixture may be determined from the dew point of the mixture.

General

The separation at low temperatures of gases obtained by the thermal cracking of petroleum oil or of similar mixtures of gases generally comprises a number of liquefaction and rectification steps. The first hydrocarbon liquefaction step may take place over a temperature interval ending at a temperature below —100° C., for example, between —100 and —115° C. Methanol is added, preferably in the form of vapour, prior to this liquefaction step and serves to prevent the formation of ice during the course of the process.

The gases are preferably subjected to a preliminary drying before the liquefaction step but this drying need not be as thorough as has hitherto been found necessary.

The methanol/water mixture which is condensed together with the liquefied hydrocarbons may be removed at the end of the said liquefaction step or at a higher temperature at a subsequent stage of the process. It is not subjected at any stage to a temperature at which ice formation will take place.

An additional advantage of the feature that the methanol/water solution is not miscible with the condensate of the hydrocarbon mixture is that it facilitates the removal of the methanol from the hydrocarbon mixture subsequent to its use to prevent ice formation. Since the methanol is immiscible with the condensed hydrocarbons and forms, together with the water dissolved in it, a liquid layer, separate from the layer of liquified hydrocarbons, the methanol with the water which it contains may be drawn off from the liquefied hydrocarbons at a suitable point in the plant, whereupon it may be conveniently dried by any known method and again introduced into the gas stream.

I claim:

1. In the process of separating hydrocarbon gases from gaseous mixtures comprising alkanes and alkenes having not more than 5 carbon atoms in the molecule wherein a stream of the gaseous mixture is compressed and cooled at a low temperature to liquefy the hydrocarbons, the improvement which comprises continuously adding to said gaseous stream prior to the cooling step a quantity of methanol which, when mixed with the water present in the gases, produces a methanol-water mixture having a freezing point below the temperature employed in the cooling step, then cooling the mixed stream of gases to a temperature between $-100°$ C. and $-138°$ C., collecting the condensate resulting from the cooling step, whereby a methanol-water mixture collects as a separate layer beneath a hydrocarbon layer, and removing said methanol-water mixture.

2. The process of claim 1 wherein the temperature of the cooling step is about $-110°$ C. and the methanol added amounts to from about 72 to 91% by weight based on the weight of the mixture of methanol with the water present.

3. The process of claim 1 wherein the methanol added, when mixed with the water present, forms a methanol-water mixture corresponding substantially in composition to the methanol-water eutectic mixture.

4. The process of claim 1 wherein the hydrocarbon gas mixture is one obtained from the thermal cracking of a petroleum oil containing hydrogen, alkanes and alkenes.

5. The process of claim 1 wherein the methanol is introduced into the gas stream in the form of a vapor.

MARTIN RUHEMANN.

REFERENCES CITED

The following references are of record in the file of this patent:

UNITED STATES PATENTS

| Number | Name | Date |
| --- | --- | --- |
| 1,702,683 | Claude | Feb. 19, 1929 |
| 2,278,750 | Walker | Apr. 7, 1942 |
| 2,295,809 | Schuftan | Sept. 15, 1942 |

FOREIGN PATENTS

| Number | Country | Date |
| --- | --- | --- |
| 18,698 | Great Britain | Nov. 10, 1910 |
| 591,095 | France | June 27, 1925 |